United States Patent [19]
Niklaus

[11] 3,791,071
[45] Feb. 12, 1974

[54] MOTOR VEHICLE CONSTRUCTION
[75] Inventor: Bernd Niklaus, Plittersdorf, Germany
[73] Assignee: Robert Bosch GmbH, Stuttgart, Germany
[22] Filed: June 26, 1972
[21] Appl. No.: 266,444

[30] Foreign Application Priority Data
July 8, 1971 Germany.............................. 2134027

[52] U.S. Cl......................... 49/140, 49/349, 74/625
[51] Int. Cl............................................. E05f 15/14
[58] Field of Search......... 49/139, 140, 349; 74/625

[56] References Cited
UNITED STATES PATENTS
3,534,630 10/1970 Schwerdhofer....................... 74/625
FOREIGN PATENTS OR APPLICATIONS
931,494 7/1963 Great Britain........................ 49/140
823,540 9/1969 Canada................................ 49/140

Primary Examiner—J. Karl Belu
Attorney, Agent, or Firm—Michael S. Striker

[57] ABSTRACT

A rotatable shaft can be turned to shift a window or similar component of a motor vehicle. A coupling is provided for turning the shaft and includes one coupling section which is fixedly mounted on and turns with the shaft and another coupling section which surrounds the shaft and is adapted to be driven by a motor. A biasing spring urges the shaft axially of itself so that the section of the coupling on the shaft engages the section which is driven by the motor. To operate the arrangement in the event that the motor should fail, a manual crank is provided which can be engaged with a free end portion of the shaft, and an arrangement is provided which, when such engagement is effected, will displace the shaft axially in a sense separating the two coupling sections so that it is not necessary to turn against the resistance of the motor.

11 Claims, 3 Drawing Figures

MOTOR VEHICLE CONSTRUCTION

BACKGROUND OF THE INVENTION

The present invention relates generally to a motor vehicle, and more particularly to an arrangement which finds use in motor vehicles. Still more particularly, the invention relates to an arrangement for displacing shiftable windows and analogous components in a motor vehicle, for instance sliding sunroofs or the like.

Such shiftable components are popularly known as power-windows, power-roofs or the like. They are driven by a special motor provided for this purpose, that is a motor which is provided for the exclusive purpose of shifting the particular component, which hereafter for the sake of convenience will be identified as a window. The motor drives a turnable shaft which, depending upon the direction in which it is rotated, causes the window to be shifted in one or the other direction, that is to be raised or lowered. From the prior art it is known to use in such an arrangement an electromagnet which is excited when the motor is energized, and which has an armature acting via a lever arm and a pinion connected with the lever arm upon a bushing which is configured analogously to a toothed rack, and which is axially shiftable but non-rotatable on the turnable shaft. When the motor is energized, and consequently the electromagnet is energized, the arrangement provides via the armature of the electromagnet and the displacement of the bushing for an action in which the two sections of a coupling provided to transmit rotation to the shaft are displaced via a helical spring against an abutment formed on the rotatable shaft, bringing them into engagement with one another and holding them in such frictional engagement. If in this prior art arrangement, a malfunction should develop in the electrical portions of the arrangement, a restoring spring restores the armature of the electromagnet to its normal rest position, in which the coupling sections are out of engagement with one another. The end portion of the bushing which faces away from the coupling sections can be connected with a hand crank in order to permit manual displacement of the window.

The arrangement just described is fully operative. It does, however, have the disadvantage that it is relatively complicated and therefore expensive, aside from the fact that it requires a relatively large amount of space which frequently is not available in the vehicle door. It must be taken into consideration here that it is the current trend to make vehicle doors as slim as possible, that is not to give them greater depth than is absolutely necessary in order to gain increased space in the interior of the vehicle without having to increase the exterior dimensions thereof. This of course reduces the space available in the interior of the door and makes it difficult in many instances to employ the arrangement just described. Furthermore, when in this arrangement it becomes necessary to utilize the hand crank, the construction of the prior art arrangement makes it necessary not only to impart a turning movement to the hand crank but also to exert a pressure upon it in axial direction of the bushing in order to assure that the crank remains connected with the bushing.

SUMMARY OF THE INVENTION

Taken into consideration the problems just outlined with respect to the prior art, it is a general object of the present invention to provide an arrangement of the character here under discussion which is not possessed of these problems.

A more particular object of the present invention is to provide such an arrangement which requires substantially less space than what is known from the prior art.

Another object of the invention is to provide such an arrangement which is considerably simplified over what is known from the prior art.

Still a further object is to provide such an arrangement which is reliable in its operation.

In pursuance of these objects and of others which will become apparent hereafter, one feature of the invention resides, in a motor vehicle, in an arrangement for displacing shiftable windows or analogous components. Briefly stated, the inventive arrangement comprises a rotatable shaft adapted to displace the shiftable component when rotated. Coupling means is provided for coupling the shaft with the motor drive and includes a first coupling section fixed on the shaft for rotation therewith, and a motor-driven second coupling section. Biasing means normally urges the coupling means into coupling engagement. Manual crank means is provided for rotating the shaft in the event of motor drive malfunction and the crank means is engageable with the shaft in a sense effecting disengagement of the coupling sections preliminary to rotation of the shaft by the crank means.

In particular, the shaft is mounted not only for rotation but also for axial displacement and when the crank means is engaged with the shaft, the shaft is subjected to axial displacement in a sense which will disengage the first coupling section carried by the shaft from the second coupling section. When this has taken place, the shaft can be rotated without having to turn over the motor drive itself. After the crank means is disengaged from the shaft, a spring arrangement provided for this purpose displaces the shaft axially to its previous position in which the first and second coupling sections engage with one another. Now, the slidable component can again be displaced via the motor drive, if the latter is operative. It will be appreciated that when the arrangement is in its normal operating condition, that is the condition in which it is to be driven by the motor drive, the coupling sections will always be in engagement with one another so that an electromagnetic unit for engaging them is not necessary, as is the case in the prior art.

A particularly simple connection between the shaft and the crank means can be obtained if a free end of the shaft is provided with a threaded portion which can be threaded into a tapped bore or hub of the crank means, with a stationary abutment being provided on a component of the vehicle against which the crank means will abut when it is threaded onto the end portion of the shaft thereby effecting the axial displacement of the shaft.

It is further advantageous, in accordance with another concept of the invention, to provide in the topped bore of the crank means an engaging member which retains the crank means on the shaft, thus assuring that once the crank means is threadedly connected with the shaft, it will remain in operative connection with the latter in both directions of rotation of the shaft. The engaging portion may advantageously be a bolt inserted into a hub of the crank means and having a projection or rib which extends into a groove or recess provided in a free end space of the threaded end portion of the shaft and the crank means is threaded on to the latter.

The invention also provides for a further possibility which is intended to assure that the engaging member can properly enter into the recess without difficulties. To assure this, the engaging member may be turnably mounted in the hub of the crank means, and in order to assure that the engaging member remains in engagement with the shaft in both directions of rotation of the latter, a pawl may be provided which assures such engagement.

The pawl may advantageously be spring-biased into such engagement, but may be disengageable against the action of the biasing spring provided for this purpose in order to assure that the crank means can be readily removed from the shaft without difficulties.

The second coupling section which is the motor-driven one, utilizes advantageously a worm wheel which can be mechanically engaged with the first coupling section on the rotatable shaft, to assure reliable power transmission to the shaft when the latter is rotated by the motor drive. A particularly simple way of providing for such a mechanical connection is obtained if one of the coupling sections is provided with projections whereas the other is provided with recesses into which the projections engage when the coupling sections are in coupling engagement.

Spring means biases the two coupling sections together, that is by acting upon the shaft, and during the motor-driven operation of the arrangement the two coupling sections are reliably and firmly held in engagement with one another. The spring means is advantageously in form of a spring element which bears against the shaft as well as a stationary component of the arrangement, for instance a housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
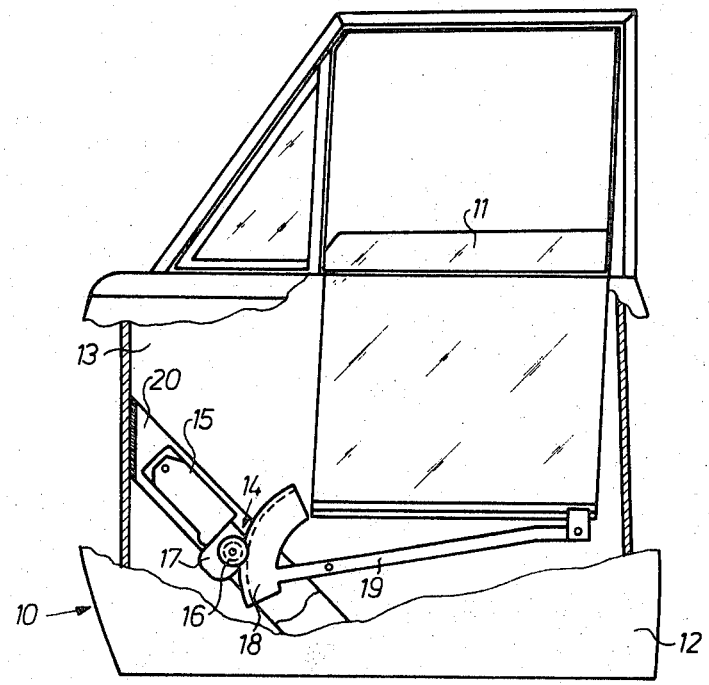
FIG. 1 is a side view of a vehicle door with the outer covering in part broken away to facilitate illustration of an arrangement according to the present invention provided in the interior of the door.

Discussing the drawing in detail, and firstly the illustration in FIG. 1, it will be seen that reference numeral 10 identifies a door of a motor vehicle. In conventional manner, the door 10 has a window 11 which is to be raised and lowered. It will be understood, however, that the invention is also applicable with respect to other shiftable components of the vehicle, for instance, a sliding sun-roof or the like.

The window 11 is to be displaced in a sense raising or lowering it by a drive arrangement 14 located between the outer wall 12 and the inner wall 13 of the door 10. The drive arrangement 14 is provided with an electromotor 15 which displaces a linkage 19 connected with the window 11, such displacement being effected via a pinion 16 of a stepdown gear 17 and a toothed segment 18. The drive arrangement 14 is mounted on a stiffening element 20 of the door 10.

Figure 2:
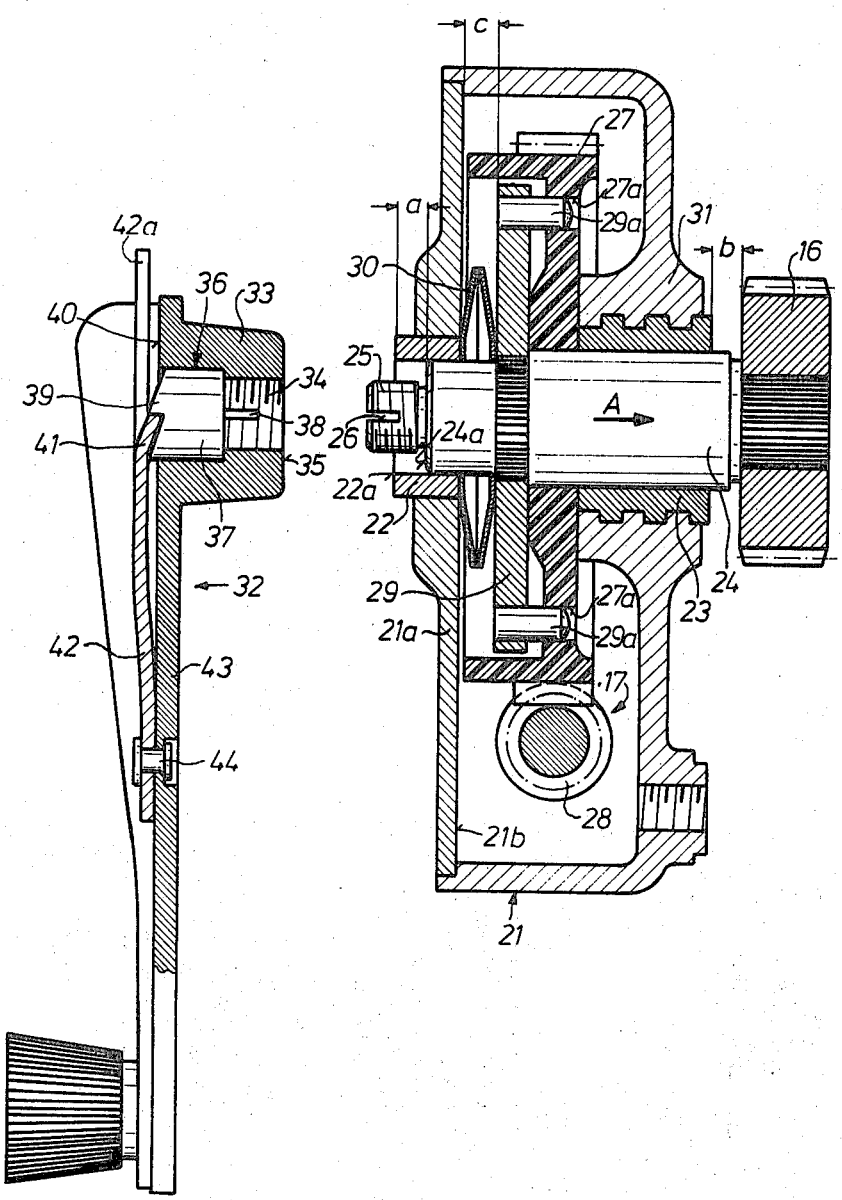
FIG. 2 is a sectional detail view, on an enlarged scale, illustrating the arrangement according to the present invention with the crank means being disengaged from the shaft.
Figure 3:
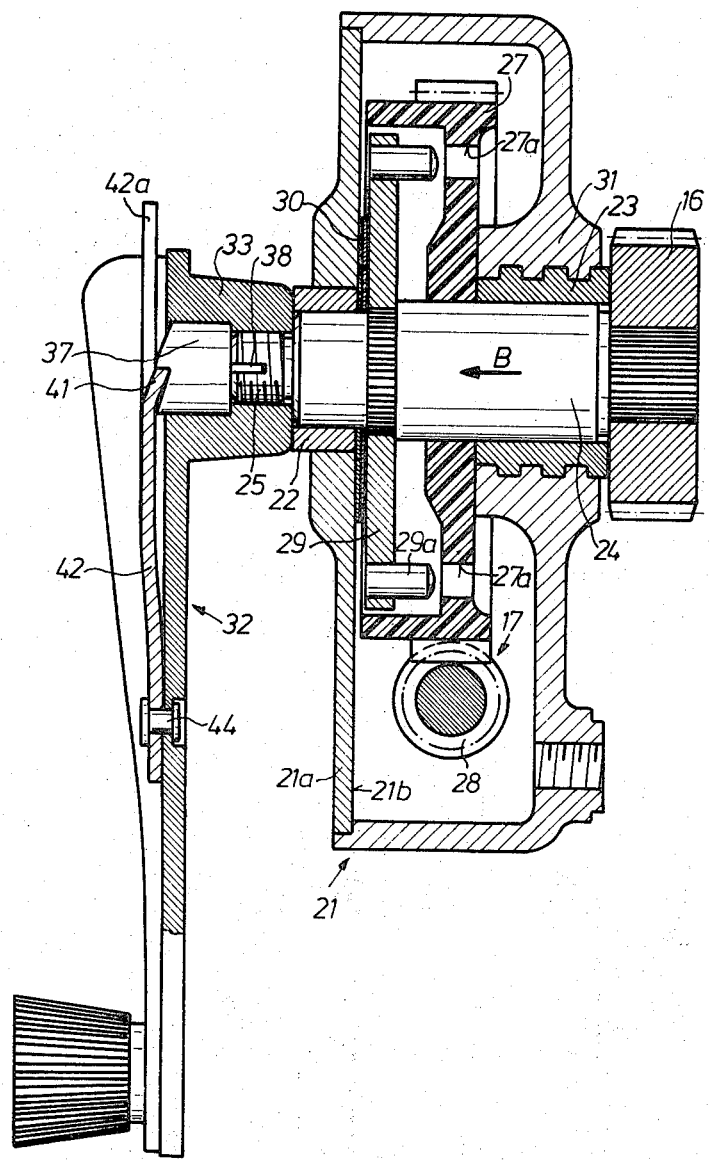
FIG. 3 is a view similar to FIG. 2 but illustrating the crank means engaged with the shaft.

Referring now to FIGS. 2 and 3 it will be seen that the gear 17 is mounted in a housing 21 in which there are also provided two journals 22 and 23, journalling a rotatable shaft 24, and also mounting with it freedom of axial displacement. One end of the shaft 24 extends out of the housing 21 and carries the pinion 16 as shown in FIGS. 2 and 3. The opposite end of the shaft 24 is provided at its end portion with screw threads, thus constituting a threaded nipple or bolt 25 which extends in part out of the housing 21. The free end face of the bolt 25 is provided with a transverse groove 26.

In order to obtain rotation of the shaft 24 via the motor 15 there is provided a worm gear 27 which is journalled on the shaft 24 with freedom of rotation relative thereto. It engages with a worm 28 and the two together constitute the stepdown gear 17. A disc member 29 is fixedly connected with the shaft 24 at the side of the worm gear 27 which faces away from the pinion 16, and between the member 29 and a removable cover 21a of the housing 21 there is provided biasing means here illustrated in form of two disc springs 30. These bear against the housing 21 and thereby against the element 20, and on the other hand against the disc member 29 and thereby against the shaft 24, permanently tending to displace the shaft 24 axially in the direction of the arrow A which is shown in FIG. 2. In this manner, the worm gear 27 is maintained in abutment with the portion 31 of the housing 21.

It will be appreciated that the worm gear 27 constitutes one and the disc member 29 constitute the other section of coupling means which is provided to drive the shaft 24 via the motor 15. The member 29 is provided in the illustrated embodiment with two projections 21a which, when the coupling sections are in engagement, extend into corresponding recesses 27a provided in the worm gear 27. The coupling sections are maintained in engagement with one another at all times (except when they are purposely separated for the use of the crank means) by the springs 30. The motor 15 thus supplies via the worm 28, the worm gear 27, the projections 29a, the disc member 29, and the shaft 24 drive power to the pinion 16 which cooperates with the components 18 and 19.

FIG. 2 shows the arrangement in the operative position which it will normally have, that is in which the window 11 is displaced by the motor 15. It will be seen that the end face 24a of the shaft 24 which faces away from the pinion 16 is spaced by a distance $a$ in the bore of the journal 22, which distance is smaller than the length of the portion 25 and smaller than the distance $b$ between the pinion 16 and the outer end face of the journal 23. Between the inner surface 21b of the cover 21a and the juxtaposed end face of the plate member 21, there exists a distance c which is greater than the distance a by at least the thickness of the two disc springs 30. The length of the portion 25 is greater than the distance a so that the portion 25 extend beyond the outer end face of the journal 22. The extent to which the projections 29a extend into the recesses 27a is smaller than the dimension a.

If a malfunction should occur in the motor drive, for instance due to electrical or any other failure, it is still desirable and often of course entirely necessary that the window 11 (or other shiftable component) be capable of displacement. For instance if a sliding sun-roof is in open condition and a malfunction occurs, a sudden rain may make it imperative to be able to close it manually. For this purpose there is provided a crank 32 having a hub 33 provided with a tapped bore 34 which can mesh with the threads of the portion 25 of the shaft 24. In the region which faces away from the end face 35 of the hub, the bore 34 is enlarged and accommodates an engaging member 36 which in the illustrated embodiment is in form of a bolt 37 movable in the enlarged portion of the bore, and a rib 36 which can be readily introduced into the groove 26 of the portion 25.

The bolt 37 has an end face which faces away from the rib 38 and is provided with teeth 39 extending over the end face 40 of the hub 33 which is opposite the end face 35. The teeth 39 in this embodiment are of saw tooth configuration and arranged in form of an annulus. They cooperate with a portion 41 which is stamped or punched out of a leaf spring 42 and one end of which leaf spring 42 is connected at the arm 43 of the hand crank 32 via a groove 44. The other end of the leaf spring 42 is identified with reference numeral 42a and is free, extending beyond the hub 33. The teeth 39 are formed in the end face of the bolt 37 and so arranged that when the hand crank 32 is threaded unto the portion 25, the portion 41 of the spring 42 —which latter is in pretensioned engagement with the bolt— can slip over the teeth 39. This means that as seen from the end face 35 of the hub 33, the engaging member 36 can be turned in clockwise direction and is engaged against displacement in counterclockwise direction because the portion 41 acts as a pawl engaging the respective teeth 39 and preventing such rotation.

If, now, a malfunction should occur in the motor and the hand crank 32 is to be used, the hand crank 32 is threaded with its hub 33 onto the portion 25, until the engaging member 36 abuts with its rib 38 against the end face of the portion 25, with further turning of the hand crank 32 resulting under the pressure of the spring 42 in entry of the rib 38 into the groove 26. The engaging member then remains in this angular position but enters deeper into the groove 26 when the hand crank 32 is turned further, until the hand crank 32 finally abuts with its end face 35 of its hub 33 against the end face 22a of the bushing or journal 22. Evidently, continued turning of the hand crank 32, after such abutment has occurred will result in axial displacement of the shaft 24, counter to the balancing action of the springs 30 by the distance a; this is indicated by the arrow B, (see FIG. 3). This displacement continues until the end face 24a abuts against the end face 35 of the hub 33, a position which is shown in FIG. 3, and in which the coupling sections 27 and 29 are out of engagement because the projections 29a of the disc or plate member 29 have been completely withdrawn from the recesses 27a of the worm gear 27.

When the hand crank is so connected with the arrangement, turning force exerted on the hand crank 32 is transmitted directly to the shaft 24 and from there upon the pinion 16. When the hand crank 32 is turned in one direction it will tightly abut against the end face 24a of the shaft 24, and in opposite direction of rotation the crank is prevented against unthreading from the portion 25 by the member 26 and the spring 42 which contacts with the free end of the portion 41 one of the teeth 39 and prevents the member 36 from turning.

Evidently, the hand crank 32 can be permitted to remain in engagement with the shaft 24, for any desired length of time, for instance, until whatever malfunction or damage has occurred to the motor drive can be repaired. It cannot become separated from the shaft 24 by itself, and can therefore simply be left in place.

On the other hand, when it is desired or when it is necessary to remove the hand crank 32 from the shaft 24, this can be carried out in a simple manner by merely pushing the free end 42a of the leaf spring 42 away from the hand crank. This disengages the connection between the member 36 and the crank 32, so that the latter can be unthreaded from the portion 35 without difficulty. Once the surfaces 35 and 22a move apart, the springs 30 push the shaft 24 axially in the direction of the arrow A (FIG. 2) until the projections 29a contact the worm gear 27. When subsequently the motor drive is energized and the worm gear 27 starts to turn, the projections 29a will enter under the urging of the springs 30 into the recesses 27a as soon as they become aligned with one another, and the coupling between the sections 27 and 29 is thereby restored, permitting motor-driven displacement of the window 11.

It is particularly advantageous with respect to the present invention that the coupling which is normally in engagement when the arrangement is to be motor driven, will automatically become disengaged as a result of engagement of the crank with the shaft. This eliminates special means to be provided for this purpose, or the possibility that a person might not be aware that separate means must be operated to effect disengagement or might not be sufficiently skilled to operate separate means.

It will be understood that each of the elements described above, or two or more together, may also find a useul application in other types of constructions differing from the types described above.

While the invention has been illustrated and described as embodied in a motor vehicle it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In a motor vehicle, an arrangement for displacing shiftable windows and analogous components, comprising a rotatable shaft adapted to displace the shiftable component when rotated; coupling means for coupling said shaft with a motor drive, including a first coupling section fixed on said shaft for rotation therewith, and a motor-driven second coupling section, said shaft and said first coupling section being jointly shiftable axially of said shaft into and out of a position in which said first coupling section is in coupling engagement with said second coupling section; biasing means normally urging said coupling means into said position; manual crank means for rotating said shaft in the event of motor drive malfunction; cooperating screw threads on said crank means and said shaft so that the former can be releasably threaded onto the latter; and shifting means for shifting said shaft out of said position in automatic response to threading of said crank means onto said shaft so as to effect disengagement of said coupling sections preliminary to rotation of said shaft by said crank means.

2. An arrangement as defined in claim 1, said shaft having a free end portion, and said crank means having a tapped bore in which said end portion is receivable; and said shifting means comprising a stationary element against which said crank means abuts in axial direction of said shaft when said end portion is received in said tapped bore.

3. An arrangement as defined in claim 2; further comprising an engaging portion in said tapped bore for engaging said shaft and retaining said crank means thereon.

4. An arrangement as defined in claim 3, said end portion having a free end face provided with a recess; and said engaging portion comprising a bolt inserted in a hub of said crank means and including a rib receivable in said recess.

5. An arrangement as defined in claim 4, said engaging portion being freely turnable in said hub when said crank means is turned in one direction for threading said end portion into said bore, but being prevented from turning when said crank means is turned in the opposite direction.

6. An arrangement as defined in claim 5, and further comprising pawl means for preventing said turning of said engaging portion when said crank means is turned in said opposite direction.

7. An arrangement as defined in claim 6, said pawl means including a pawl member, and a biasing element urging said pawl member into releasable engagement with said engaging portion.

8. An arrangement as defined in claim 1, said second coupling section including a worm wheel arranged to interengage with said first coupling section.

9. An arrangement as defined in claim 8, wherein one of said coupling sections is provided with recesses, and the other coupling section is provided with projections which extend into said recesses when said coupling sections are in coupling engagement.

10. An arrangement as defined in claim 1, said biasing means comprising spring biasing means.

11. An arrangement as defined in claim 10; further comprising a stationary component; and wherein said spring biasing means bears upon said stationary component and said shaft.

* * * * *